(12) United States Patent
Gnabah et al.

(10) Patent No.: US 11,888,257 B2
(45) Date of Patent: Jan. 30, 2024

(54) HIGH VOLTAGE CONNECTION FOR BUSBAR ASSEMBLY

(71) Applicant: Schaeffler Technologies AG & Co. KG, Herzogenaurach (DE)

(72) Inventors: Zachary Gnabah, Canton, OH (US); Jeremy Vanni, Medina, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 2 days.

(21) Appl. No.: 17/319,603

(22) Filed: May 13, 2021

(65) Prior Publication Data
US 2022/0368064 A1    Nov. 17, 2022

(51) Int. Cl.
H01R 13/52     (2006.01)
H01R 25/16     (2006.01)

(52) U.S. Cl.
CPC ....... H01R 13/5202 (2013.01); H01R 25/162 (2013.01)

(58) Field of Classification Search
CPC ................ H01R 13/5202; H01R 13/52; H01R 13/5205; H01R 13/5208; H01R 25/161; H01R 25/162; H01R 25/16
USPC .................................. 438/588, 272, 721, 589
See application file for complete search history.

(56) References Cited

U.S. PATENT DOCUMENTS

| | | | | |
|---|---|---|---|---|
| 7,572,150 B2* | 8/2009 | Matsuoka | .......... | H01R 13/4223 439/626 |
| 7,959,464 B2* | 6/2011 | Mizutani | ............ | H01R 13/5205 439/588 |
| 8,424,187 B2* | 4/2013 | Bote Salla | ............... | H02K 3/47 29/874 |
| 9,385,516 B2* | 7/2016 | Tanaka | ............... | H01R 13/4367 |
| 9,570,899 B2* | 2/2017 | Tanaka | ................ | H02G 15/013 |
| 10,038,287 B2* | 7/2018 | Yamada | ............. | H01R 13/5202 |
| 2004/0178029 A1* | 9/2004 | Hoyte | ..................... | F16D 65/12 188/218 XL |
| 2004/0214477 A1* | 10/2004 | Ikeda | ....................... | H01R 9/18 439/709 |
| 2009/0137153 A1* | 5/2009 | Yoshioka | ............. | H01R 13/506 439/607.24 |
| 2011/0316372 A1* | 12/2011 | Kobayashi | ........... | H01R 13/521 310/71 |

(Continued)

OTHER PUBLICATIONS

Website: Wieland Worldwide, "Components for eMobility" Retrieved from http://www.wieland.com/en/components-for-emobility#highvoltagecomponents on Jan. 4, 2021 (Published Sep. 2020).

*Primary Examiner* — Harshad C Patel
(74) *Attorney, Agent, or Firm* — Volpe Koenig

(57) ABSTRACT

A busbar assembly is disclosed herein. The assembly includes a ring body having a plurality of openings extending in an axial direction and configured to receive electrical wire connections, and a plurality of phase conductors. A high-voltage connection portion is also included in this same body. The high-voltage connection portion includes a plurality of high voltage conductors each configured to engage a respective one of the plurality of phase conductors. A plurality of connectors are each attached to a respective one of the plurality of high voltage conductors. A seal is arranged on a periphery of the high-voltage connection portion to incorporate the busbar into one combined simple design.

20 Claims, 4 Drawing Sheets

(56) References Cited

U.S. PATENT DOCUMENTS

| | | | | |
|---|---|---|---|---|
| 2011/0316373 | A1* | 12/2011 | Kobayashi | H02K 11/33 310/71 |
| 2012/0100752 | A1* | 4/2012 | Ooki | C08L 81/02 439/588 |
| 2012/0190250 | A1* | 7/2012 | Patel | H02K 5/225 439/884 |
| 2013/0183870 | A1* | 7/2013 | Chrabascz | B64D 41/007 439/709 |
| 2014/0242838 | A1* | 8/2014 | Ikezawa | H01R 13/405 439/587 |
| 2014/0287631 | A1* | 9/2014 | Tashiro | H01R 43/20 439/733.1 |
| 2017/0321739 | A1* | 11/2017 | Manem | F16B 37/068 |
| 2019/0351934 | A1* | 11/2019 | Kim | B62D 5/0403 |

* cited by examiner

HIGH VOLTAGE CONNECTION FOR BUSBAR ASSEMBLY

TECHNICAL FIELD

The present disclosure relates to a busbar assembly.

BACKGROUND

Electric motors generally include a stator, rotor, and other components. One such component is a busbar or contact carrier, which provides an electrical interface with a stator. Based on the varying shapes and sizes of electric motors, busbars can take on a variety of shapes, sizes, and configurations. It is important to protect various electronic aspects of the electric motors from dust, water, and other contaminants.

There is a general desire to provide a busbar that is uncomplicated to manufacture and assemble that provides protections for the power electronic unit (PEU), connection site, or other connection body from dust, water, and other contaminants.

SUMMARY

The present disclosure provides a busbar assembly. The assembly includes a ring body having a plurality of openings configured to receive electrical wire connections, and a plurality of phase conductors. A high-voltage connection portion is also included. The high-voltage connection portion includes a plurality of high voltage conductors each configured to engage a respective one of the plurality of phase conductors. A plurality of connectors are each attached to a respective one of the plurality of high voltage conductors. A seal is arranged on a periphery of the high-voltage connection portion.

The seal is arranged within a groove formed on the high-voltage connection portion, in one embodiment. A majority of the seal can be positioned within a groove formed on the high-voltage connection portion.

The seal is arranged on a periphery of the high-voltage connection portion such that the seal surrounds the plurality of connectors, in one aspect.

The plurality of openings on the ring body can each have a chamfered, angled, curved, or tapered surface.

The plurality of connectors are secured to a surface of a respective one of the plurality of high voltage conductors.

The plurality of high voltage conductors each define an opening configured to receive a respective one of the plurality of connectors. The plurality of connectors overlap in an axial direction with at least one of the plurality of phase conductors.

The seal is configured to engage with a portion of a motor or other outer casing or housing.

The shape of the seal can vary. In one aspect, the seal includes two inner sealing legs and one outer sealing face.

The busbar assembly can be formed by injection molding.

In one aspect, the plurality of connectors are blind clinch nuts.

Additional embodiments are described below and in the claims.

BRIEF DESCRIPTION OF THE DRAWINGS

The foregoing Summary and the following Detailed Description will be better understood when read in conjunction with the appended drawings, which illustrate a preferred embodiment of the disclosure. In the drawings.

DETAILED DESCRIPTION

Figure 1:
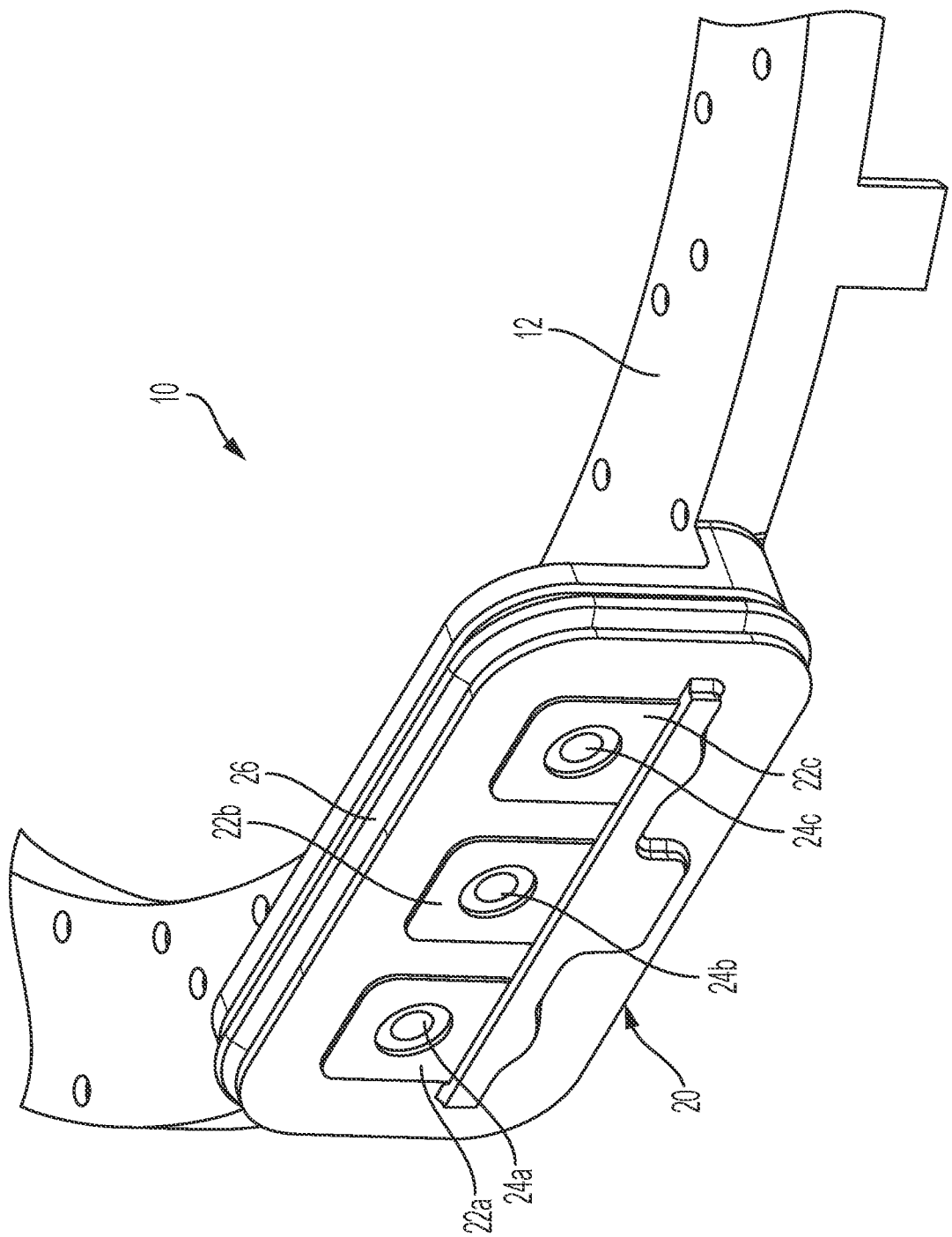
FIG. 1 is a perspective view of a high voltage connection portion of a busbar assembly.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. This terminology includes the words specifically noted above, derivatives thereof and words of similar import.

Figure 2:
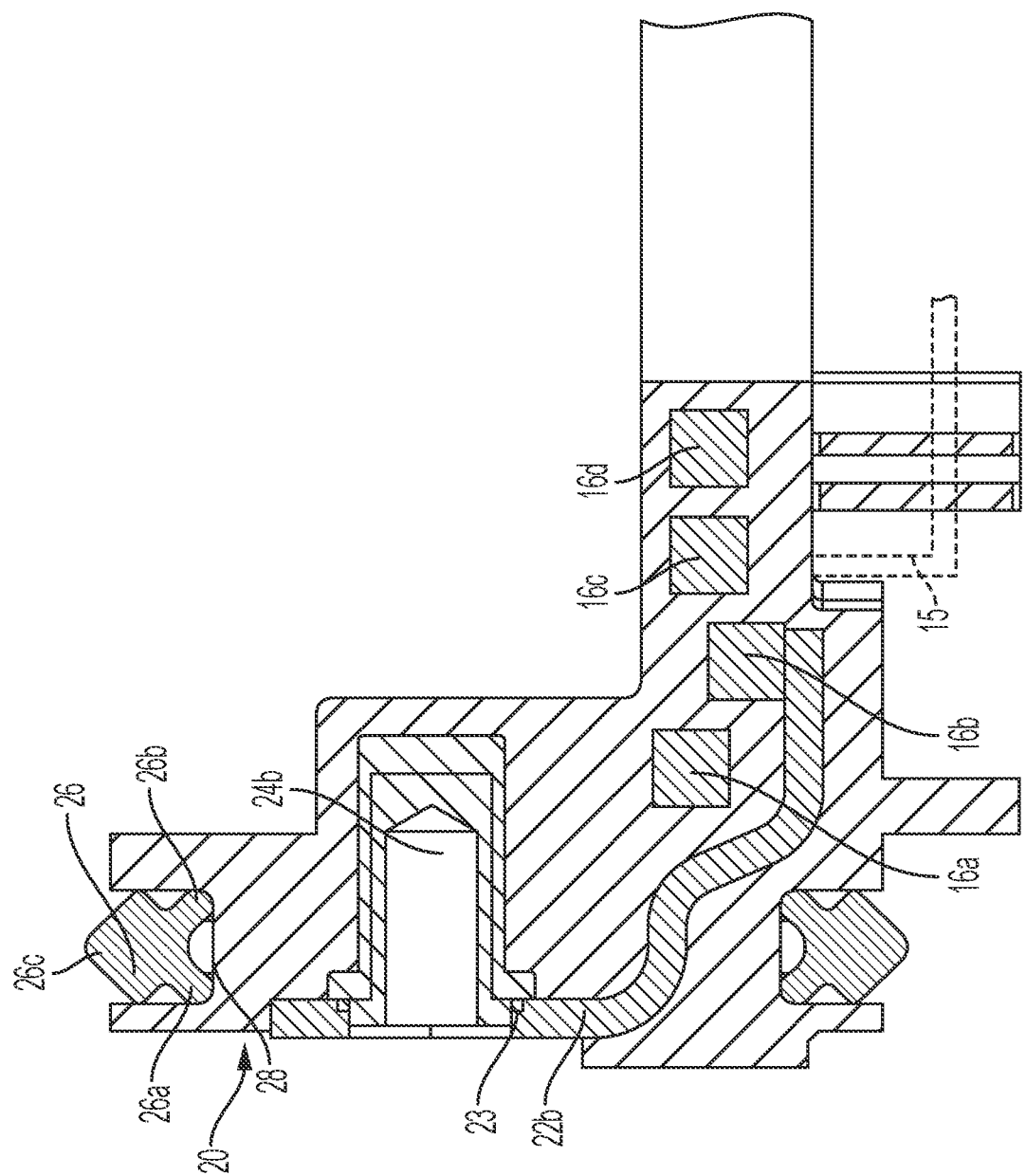
FIG. 2 is a cross-sectional view of the high voltage connection portion of FIG. 1.
Figure 3:
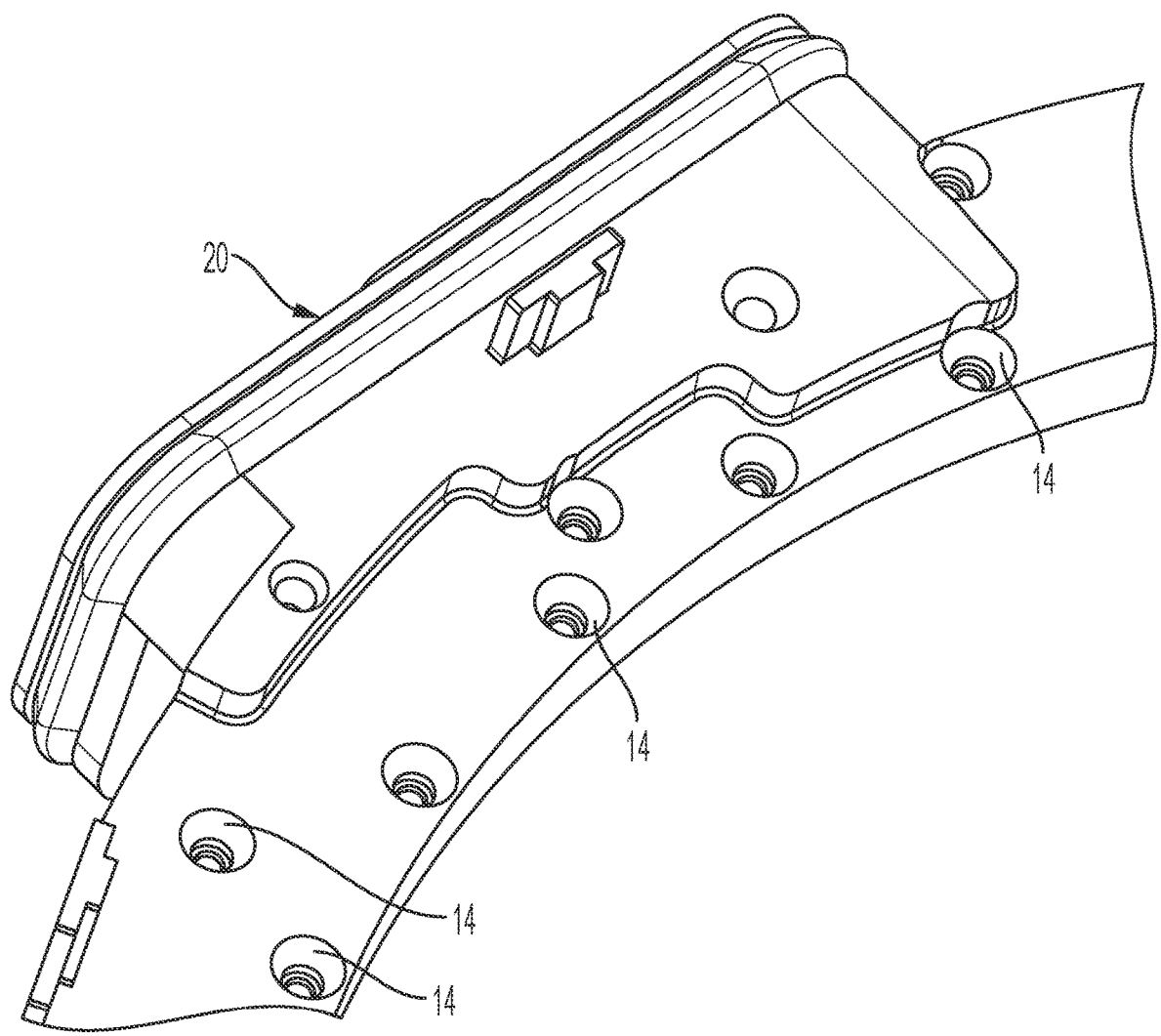
FIG. 3 is a bottom perspective view of the high voltage connection portion of FIGS. 1 and 2.

Referring to FIG. 1, a busbar assembly 10 is disclosed. The busbar assembly 10 incudes a ring body 12. The ring body 12 comprises a plurality of openings 14 configured to receive electrical wire connections 15, which are shown in dashed lines in FIG. 2. Only one electrical wire connection 15 is shown in FIG. 2, but one skilled in the art would understand that multiple wires or wire connections would be provided. The ring body 12 also includes a plurality of phase conductors 16a, 16b, 16c, as well as a neutral conductor 16d. One skilled in the art would understand that the number of conductors can vary based on motor architecture. In one aspect, the busbar assembly 10 is formed by injection molding. More specifically, the busbar assembly 10 can be formed by overmolding.

The busbar assembly 10 includes a high-voltage connection portion 20 comprising a plurality of high voltage conductors 22a, 22b, 22c each configured to engage a respective conductor of the plurality of phase conductors 16a, 16b, 16c. The busbar assembly 10 and the high-voltage connection portion 20 can be integrally formed or molded with each other, as shown in the Figures.

As used in this application, the term high-voltage can refer to 48 volts. In another aspect, the term high-voltage refers to applications using hundreds of volts. In another aspect, one skilled in the art would understand that the concepts and features disclosed herein can be used in connection with low voltage applications.

A plurality of connectors 24a, 24, 24c are each attached to a respective conductor of the plurality of high voltage conductors 22a, 22b, 22c and are arranged within the high-voltage connection portion 20. In one aspect, a blind clinch nut is used to attach any electrical connection. One example of a blind clinch nut is a threaded nut that does not have an open end and can use a knurled surface to interference fit with another component, i.e. the high voltage conductors 22a, 22b, 22c.

In one aspect, the plurality of connectors 24a, 24, 24c are blind clinch nuts. As used herein, the term blind clinch nuts can refer to a self-clinching blind nut. In one aspect, these types of nuts provide an improved sealing configuration due to their blind configuration (i.e. closed end). One skilled in the art would understand based on this disclosure that other connections could be used. For example, open ended clinch nuts, projection welded nuts, riveted nuts, flow drilling or any other fastening method could be used. One skilled in the art would understand that some types of clinching or securing arrangements other than blind clinch nuts may have additional challenges or considerations with respect to sealing via the overmolding process. In another aspect, the fastener or fastening configuration can be installed after the overmolding process, such as by forming threads or inserting another fastening arrangement.

The plurality of blind clinch nuts 24a, 24, 24c are secured directly to an outer region of a respective conductor of the plurality of high voltage conductors 22a, 22b, 22c. In one aspect, the plurality of high voltage conductors 22a, 22b, 22c each define an opening 23 configured to receive a respective one of the plurality of blind clinch nuts 24a, 24, 24c. The plurality of blind clinch nuts 24a, 24, 24c overlap in an axial direction with at least one conductor of the plurality of phase conductors 16a, 16b, 16c.

A seal 26 is arranged on a periphery of the high-voltage connection portion 20. In one aspect, the seal 26 is a rectangular static radial seal made from a rubber material, such as a silicone material. In one aspect, the seal 27 has a hybrid X-shape profile and D-shape profile. The seal 26 is Ingress Protection Code (IPC) 6k and 9k, i.e. 6k9k compliant.

In one aspect, the seal 26 is arranged within a groove 28 formed on the high-voltage connection portion 20. In this way, the seal 26 is captively secured with the high-voltage connection portion 20. A majority of the seal 26 can be arranged or positioned within the groove 28, as shown in FIG. 2. In one aspect, the term periphery of the high-voltage connection portion 20 refers to a lateral or circumferential outer surface of the high-voltage connection portion 20. The seal 26 can have a generally rectangular profile that matches an outer periphery of the high-voltage connection portion 20.

The seal 26 is arranged on a periphery of the high-voltage connection portion 20 such that the seal 26 surrounds the plurality of blind clinch nuts 24a, 24b, 24c. The exact configuration and shape of the seal 26 can vary, as one skilled in the art would appreciate from the present disclosure. In one aspect, the seal 26 includes two inner legs 26a, 26b and one outer sealing face 26c.

In one aspect, the plurality of openings 14 on the ring body 12 have a chamfered surface. One skilled in the art would understand that the openings 14 can have other shapes, such as funnels, cones, or any curved or tapered surface. The shape of these openings 14 result in a production-friendly arrangement in which electrical connections must be made via the openings 14. In other words, the shape of the openings 14 generally guides insertion of electrical windings or wires into the openings 14.

Figure 4:
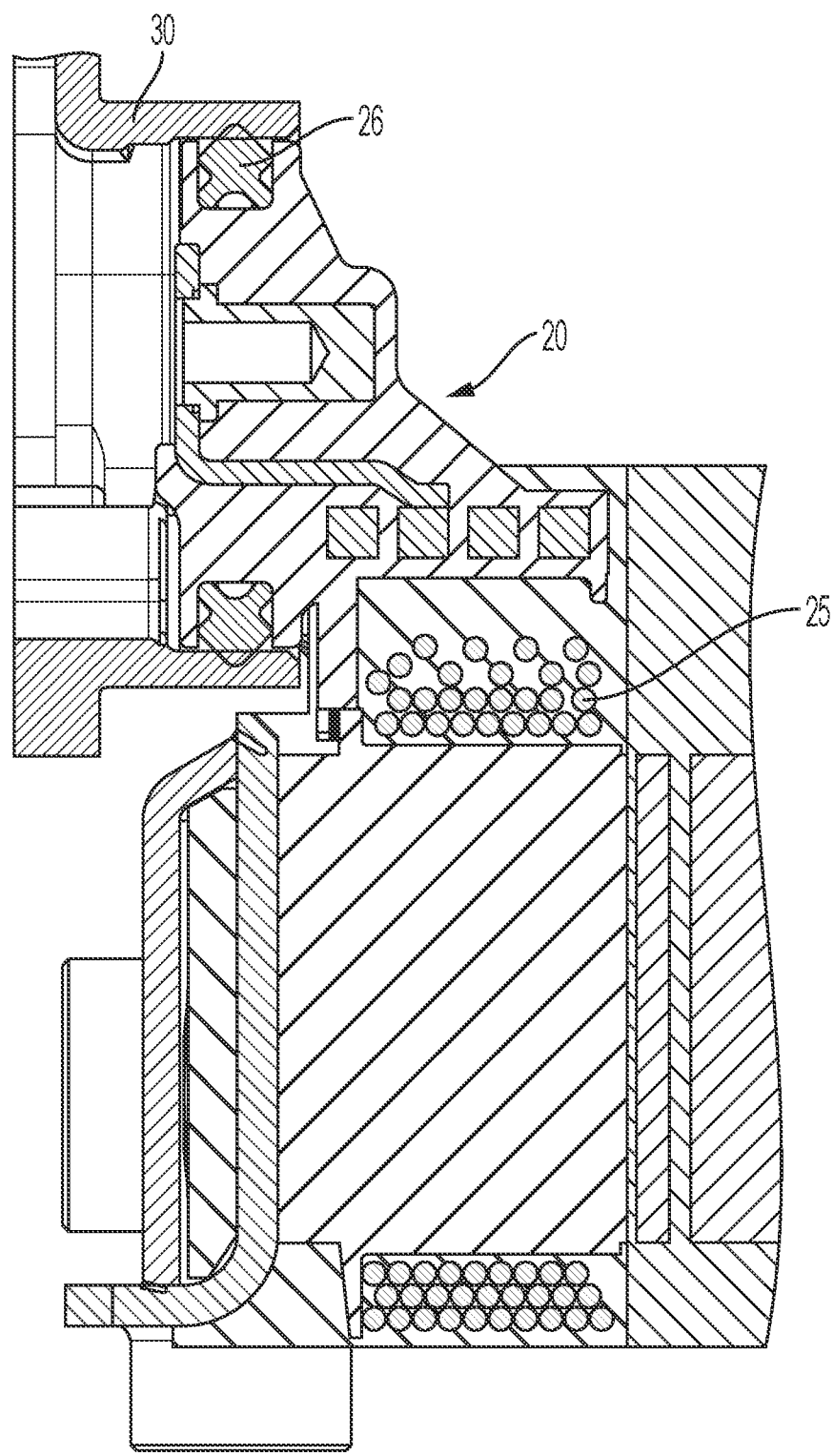
FIG. 4 is a cross-sectional view of the high voltage connection portion of FIGS. 1-3 to show its engagement with other components.

As shown in FIG. 4, the seal 26 is configured to engage with a component 30 of the motor. In one aspect, component 30 can be a junction box, housing, sleeve, or other type of encapsulation. As shown in FIG. 4, the seal 26 is positioned inside component 30. The interfaces of the busbar can vary slightly with applications. In one aspect, the electric motor, along with the busbar, is inserted into a housing.

Each motor coil 25 shown in FIG. 4 connects to two high voltage conductor rings 16a-16d, in one aspect. One skilled in the art would understand that the number and exact connection method can vary based on motor architecture. For example, in Y-architecture configurations, the busbar has a plurality of conductors, typically three or six, and one neutral conductor. The coils each connect to one conductor and one neutral conductor. In delta architecture configurations, the busbar has a plurality of conductors, such as three conductors, and a neutral conductor can be omitted. The coils each connect to two of the conductors in this aspect.

The configurations disclosed herein provide a busbar assembly 10 that at least meets IPC 6k9k. The seal 26 on the busbar assembly 10 ensures that dust, water, or other contaminants do not damage the busbar assembly 10 or the associated junction box. The configurations disclosed herein also provide a busbar assembly 10 that is capable of being manufactured and assembled in high volumes, while maintaining sufficient protection against contaminants. The seal 26, blind clinch nuts 24a, 24, 24c, and the chamfered openings 14 improve manufacturing efficiencies, while also ensuring adequate sealing protection.

Having thus described the present embodiments in detail, it is to be appreciated and will be apparent to those skilled in the art that many physical changes, only a few of which are exemplified in the detailed description of the disclosure, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the disclosure being indicated by the appended claims rather than by the foregoing description, and all alternate embodiments and changes to this embodiment which come within the meaning and range of equivalency of said claims are therefore to be embraced therein.

LOG OF REFERENCE NUMERALS busbar assembly 10
ring body 12
openings 14
phase conductors 16a, 16b, 16c
high-voltage connection portion 20
high voltage conductors 22a, 22b, 22c
opening 23
connectors 24a, 24, 24c
motor coil 25
seal 26
sealing legs 26a, 26b
sealing face 26c
groove 28
motor component 30

The invention claimed is:

1. A busbar assembly comprising:
an annular ring body including:
a plurality of openings extending in an axial direction and configured to receive electrical wire connections, and
a plurality of phase conductors extending in a circumferential direction;
a high-voltage connection portion having a planar face extending in a plane tangential to the ring body and disposed radially outwardly of the ring body, and including:
a plurality of high voltage conductors each configured to engage a respective one of the plurality of phase conductors;

a plurality of connectors each attached to a respective one of the plurality of high voltage conductors; and a seal arranged on a periphery of the high-voltage connection portion, wherein the seal is arranged within a groove formed on the high-voltage connection portion such that the seal is retained between opposing walls of the groove;

wherein the plurality of connectors are exposed to the planar face of the high-voltage connection portion.

2. The busbar assembly of claim 1, wherein the seal is arranged on a periphery of the high-voltage connection portion such that the seal surrounds the plurality of connectors.

3. The busbar assembly of claim 1, wherein the plurality of openings on the ring body have a chamfered surface.

4. The busbar assembly of claim 1, wherein the plurality of connectors are secured to a surface of a respective one of the plurality of high voltage conductors.

5. The busbar assembly of claim 4, wherein the plurality of high voltage conductors each define an opening configured to receive a respective one of the plurality of connectors.

6. The busbar assembly of claim 1, wherein the plurality of connectors overlap in an axial direction with at least one of the plurality of phase conductors.

7. The busbar assembly of claim 1, wherein the seal is configured to engage with a portion of a motor.

8. The busbar assembly of claim 1, wherein the seal includes two inner sealing legs and one outer sealing face.

9. The busbar assembly of claim 1, wherein a majority of the seal is positioned within the groove formed on the high-voltage connection portion.

10. The busbar assembly of claim 1, wherein the busbar assembly is formed by overmolding.

11. The busbar assembly of claim 1, wherein the plurality of connectors are blind clinch nuts.

12. The busbar assembly of claim 1, wherein the ring body and the high-voltage connection portion are integrally formed with each other.

13. The busbar assembly of claim 1, wherein the seal is captively secured with the high-voltage connection portion.

14. The busbar assembly of claim 1, wherein the seal is dimensioned to be received within a motor enclosure and engage with the motor enclosure.

15. A busbar assembly comprising:

an annular ring body including a plurality of openings extending in an axial direction and configured to receive electrical wire connections, the plurality of openings each have a chamfered surface;

a high-voltage connection portion having a planar face extending in a plane tangential to the ring body and disposed radially outwardly of the ring body and including a plurality of connectors; and a seal arranged around a periphery of the high-voltage connection portion, wherein the seal is arranged within a groove formed on the high-voltage connection portion such that the seal is retained between opposing walls of the groove;

wherein the plurality of connectors are exposed to the planar face of the high-voltage connection portion.

16. The busbar assembly of claim 15, wherein the plurality of connectors are blind clinch nuts that are secured to a respective one of a plurality of high voltage conductors.

17. The busbar assembly of claim 15, wherein the seal is dimensioned to be received within a motor enclosure and engage with the motor enclosure.

18. The busbar assembly of claim 15, wherein the seal is captively secured with the high-voltage connection portion.

19. A busbar assembly comprising:

a ring body including:
a plurality of openings configured to receive electrical wire connections, and
a plurality of phase conductors extending in a circumferential direction about the ring body;

a high-voltage connection portion having a planar face extending in a plane tangential to the ring body and disposed radially outwardly of the ring body and including:
a plurality of high voltage conductors each configured to engage a respective one of the plurality of phase conductors; and
a plurality of connectors each attached to a respective one of the plurality of high voltage conductors;
wherein the plurality of high voltage conductors are exposed on the planar face of the high-voltage connection portion; and
wherein the plurality of connectors are exposed to the planar face of the high-voltage connection portion.

20. The busbar assembly of claim 19, wherein the plurality of connectors are disposed radially outwardly of the ring body, and wherein the plurality of connectors are blind clinch nuts each received in an opening of a respective conductor of the plurality of high voltage conductors and secured directly to an outer region of a respective conductor of the plurality of high voltage conductors.

* * * * *